United States Patent
Voloshin

[19]

[11] Patent Number: 6,108,312
[45] Date of Patent: Aug. 22, 2000

[54] METHOD AND APPARATUS FOR AUTOMATIC ACTIVATION OF A CLOCK MASTER ON A STACKABLE REPEATER

[75] Inventor: Moshe Voloshin, Sunnyvale, Calif.

[73] Assignee: Cisco Technology, Inc., San Jose, Calif.

[21] Appl. No.: 08/965,460

[22] Filed: Nov. 6, 1997

Related U.S. Application Data

[60] Provisional application No. 60/058,611, Sep. 10, 1997, and provisional application No. 60/062,391, Oct. 7, 1997.

[51] Int. Cl.$^7$ .................................. H04B 1/56; H04J 3/08
[52] U.S. Cl. .......................... 370/274; 370/502; 370/445; 710/101
[58] Field of Search ..................................... 370/274, 445, 370/446, 503, 502; 375/356, 211; 340/825.05; 710/100, 101, 129

[56] References Cited

U.S. PATENT DOCUMENTS

| | | | |
|---|---|---|---|
| 5,680,113 | 10/1997 | Allen et al. .......................... | 340/825.05 |
| 5,805,596 | 9/1998 | Kranzler et al. .......................... | 370/445 |
| 5,945,814 | 8/1999 | Covaro ...................................... | 323/224 |
| 5,961,619 | 10/1999 | Voloshin .................................. | 710/101 |

OTHER PUBLICATIONS

Network Systems Tutorial for IEEE Std 802.3, Repeater Functions and System Design Topology Considerations for Carrier Sense Multiple Access with Collision Detection (CSMA/CD) Local Area Networks (LANs); Section 4, Repeater Functions, pp. 7–14 (1995).
International Standard ISO/IEC 8802-3: 1996(E) ANSI/IEEE Std 802.3, 1996 Edition; Carrier sense multiple access with collision detection (CSMA/DC) access method and physical layer specifications; Section 9, Repeater unit for 10 Mb/s baseband networks, pp. 125–155.

*Primary Examiner*—Chau Nguyen
*Assistant Examiner*—Phuongchau Ba Nguyen
*Attorney, Agent, or Firm*—Ritter, Van Pelt & Yi LLP

[57] ABSTRACT

An apparatus for automatically activating a clock master circuit in a stack of Fast Ethernet repeaters includes a first stackable Fast Ethernet repeater is disclosed. The first stackable Fast Ethernet repeater includes a first on pin having a first on pin logical state. The first on pin logical state is indicative of whether or not the first stackable Fast Ethernet repeater is configured in the stack of Fast Ethernet repeaters so that no other Fast Ethernet repeater occupying a position in the Fast Ethernet repeater stack that is before the position of the first Fast Ethernet repeater is powered on. A weak pull up voltage source is connected to the first on pin. The weak pull up voltage is derived from a switched power supply in the Fast Ethernet repeater so that when the Fast Ethernet repeater is powered on, the weak pull up voltage is present and when the Fast Ethernet repeater is powered off, the weak pull up voltage is not present. A clock master circuit has an enable input that is controlled by the first on pin logical state. A second stackable Fast Ethernet repeater includes a power state output pin. The power state output pin is configured to be connected to ground when the second Fast Ethernet repeater is powered on. A connector cable runs from the first Fast Ethernet repeater to the second Fast Ethernet repeater. The connector cable connects the first on pin from the first stackable Fast Ethernet Repeater to the power state output pin of the second stackable Fast Ethernet repeater. Thus, the clock master circuit in the first stackable Fast Ethernet Repeater is enabled based on whether the second stackable Fast Ethernet repeater is powered on.

9 Claims, 5 Drawing Sheets

METHOD AND APPARATUS FOR AUTOMATIC ACTIVATION OF A CLOCK MASTER ON A STACKABLE REPEATER

CROSS REFERENCE TO RELATED APPLICATIONS

This application claims priority to U.S. Provisional Patent Application No. 60/058,611 filed Sep. 10, 1997 and U.S. Provisional Patent Application No. 60/062,391, filed Oct. 7, 1997.

This application is related to co-pending U.S. patent application Ser. Nos. 08/965,479, 08/965,330, 08/964,602, 08/964,601, 08/965,320 and 08/965,323, filed concurrently herewith, which are incorporated herein by reference for all purposes.

BACKGROUND OF THE INVENTION

1. Field of the Invention

The present invention relates generally to methods and apparatuses for automatic activation of a clock master on a Class II Fast Ethernet repeater stack. In order to enable the repeater stack to comply with the Class II latency requirements in the IEEE 802.3 standard, a synchronous stack bus is provided for the repeaters in the repeater stack. The present invention relates to methods and apparatuses for automatically selecting a repeater from among the group of repeaters in the Fast Ethernet repeater stack to be the repeater that provides a master clock signal for the synchronous bus.

2. Description of the Related Art

The growth of local-area networks (LANs) has been driven by the introduction of Ethernet Technology as well as the availability of powerful, affordable personal computers and workstations. As a result, applications that once were possible only on mainframe computers are now running on LANs. Network speed and availability are critical requirements. However, existing applications and a new generation of multimedia, groupware, imaging, and database products can tax a network running at Ethernet's traditional speed of 10 megabits per second (Mbps). Moreover, with more applications requiring faster LAN speeds for acceptable performance, network managers increasingly find that high-performance computation platforms and mission-critical applications can overwhelm a 10 Mbps network. Network managers therefore are increasingly implementing high-speed LAN technology.

Fast Ethernet

For organizations with existing Ethernet installations, increasing the network speed to 100 Mbps is preferable to investing in a completely new LAN technology. This user preference has driven the industry's decision to specify a higher-speed Ethernet that operates at 100 Mbps. This higher-speed Ethernet is known as Fast Ethernet.

In July 1993, a group of networking companies joined to form the Fast Ethernet Alliance. The charter of the group was to draft the 802.3u 100BaseT specification ("802.3 specification") of the Institute of Electrical and Electronics Engineers (IEEE) and to accelerate market acceptance of Fast Ethernet technology. The final IEEE 802.3 specification was approved in June 1995. Among the other goals of the Fast Ethernet Alliance are: to maintain the Ethernet transmission protocol Carrier Sense Multiple Access Collision Detection (CSMA/CD); to support popular cabling schemes; and to ensure that Fast Ethernet technology will not require changes to the upper-layer protocols and software that run on LAN workstations. For example, no changes are necessary to Simple Network Management Protocol (SNMP) management software or Management Information Bases (MIBs) in order to implement Fast Ethernet.

Other high-speed technologies, such as 100VG-AnyLAN and Asynchronous Transfer Mode (ATM), achieve data rates in excess of 100 Mbps by implementing different protocols that require translation when data moves to and from 10BaseT. Protocol translation requires changing the frame, which often incurs higher latencies when passing through layer 2 (data-link layer) LAN switches.

In many cases, organizations can upgrade to 100BaseT technology without replacing existing wiring. Options for 100BaseT media are the same as those for 10BaseT. They include shielded and unshielded twisted pair (STP and UTP) and fiber. The Media Independent Interface (MII) provides a single interface that can support external transceivers for any of the 100BaseT physical sublayers.

CSMA/CD

Carrier sense-collision detection is widely used in LANs. Many vendors use this technique with Ethernet and the IEEE 802.3 specification. A carrier sense LAN considers all stations as peers; the stations contend for the use of the channel on an equal basis. Before transmitting, the stations monitor the channel to determine if the channel is active (that is, if another station is sending data on the channel). If the channel is idle, any station with data to transmit can send its traffic onto the channel. If the channel is occupied, the stations must defer to the station using the channel.

Figure 1:
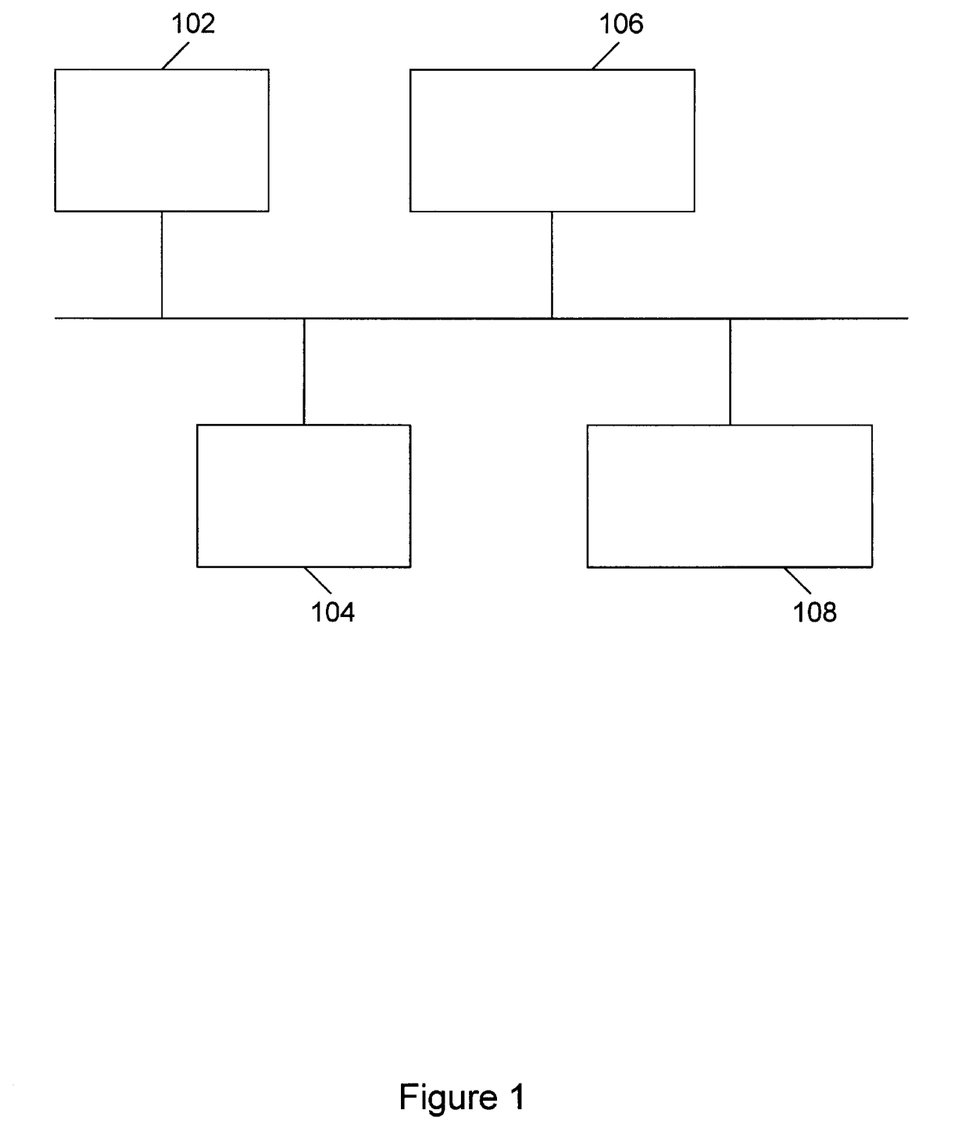
FIG. 1 is a block diagram illustrating a carrier sense-collision detection LAN.

FIG. 1 depicts a carrier sense-collision detection LAN. Network devices 102, 104, 106, and 108 are attached to a network bus 110. Only one network device at a time is allowed to broadcast over the bus, since if more than one device were to broadcast at the same time, the combination of signals on the bus would likely not be intelligible. For example, assume network devices 102 and 104 want to transmit traffic. Network device 108, however, is currently using the channel, so network devices 102 and 104 must "listen" and defer to the signal from network device 108, which is occupying the bus. When the bus goes idle, network devices 102 and 104 can then attempt to acquire the bus to broadcast their messages.

Because network device 102's transmission requires time to propagate to other network devices, these other network devices might be unaware that network device 102's signal is on the channel. In this situation, network device 102 or 104 could transmit its traffic even if network device 108 had already seized the channel after detecting that the channel was idle. This problem is called the collision window. The collision window is a factor of the propagation delay of the signal and the distance between two competing stations. Propagation delay is the delay that occurs before a a network device can detect that another network device is transmitting.

Each network device is capable of transmitting and listening to the channel simultaneously. When two network device signals collide, they create voltage irregularities on the channel, which are sensed by the colliding network devices. The network devices then turn off their transmission and, through an individually randomized wait period, attempt to seize the channel again. Randomized waiting decreases the chances of another collision because it is unlikely that the competing network devices generate the same wait time.

It is important that the total propagation delay not exceed the amount of time that is required to send the smallest size data frame. This allows devices to discard data corrupted by collisions by simply discarding all partial frames. It is therefore not desirable for entire frames of data to be sent before a collision is detected. Carrier sense networks are usually implemented on short-distance LANs because the collision window lengthens as the channel gets longer. Longer channels provide opportunity for the more collisions and can reduce through-put in the network. Generally, a long propagation delay coupled with short frames and high data transfer rates give rise to a greater incidence of collisions. Longer frames can mitigate the effect of long delay, but they reduce the opportunity for competing stations to acquire the channel.

The IEEE 802.3 specification sets a standard minimum frame size of 64 bytes (512 bits). Therefore, in order for a network to comply with the standard, a station on the network must not be able to transmit 64 bytes of data before a collision is detected.

Although Fast Ethernet maintains CSMA/CD, the Ethernet transmission protocol, it reduces the transmission time for each bit by a factor of 10. Thus, the Fast Ethernet packet speed increases tenfold, from 10 Mbps to 100 Mbps. Data can move between Ethernet and Fast Ethernet without requiring protocol translation or software changes, because Fast Ethernet maintains the 10 BaseT error control functions as well as the frame format and length.

Repeaters

While some Ethernet applications connect numerous network devices to a network bus that is literally a cable connecting the network devices, it is often more desirable to connect network devices using a repeater or hub. It should be noted that in the following description the term "hub" and the term "repeater" are used interchangeably. The repeater manages collision detection for the network devices so that the network devices need only broadcast messages without detecting collisions. The repeater notifies a network device when a collision occurs during its attempt to transmit. In addition, the repeater implements a star topology so that more devices can be included on the network without violating any cable length restriction and so that many devices can be added or removed from the network efficiently.

An Ethernet repeater is a device that serves as a central station for plugging network devices included in an Ethernet network, hence the term "hub." The Ethernet repeater receives messages from the network devices that are plugged into it and broadcasts (or "repeats") the message to all of the other devices on the network along a network bus if no collision is detected. The repeater monitors network traffic in its collision domain and assumes the responsibility for collision detection. The network devices thus simply broadcast messages to the repeater and do not need to first listen before sending messages. If the repeater has already assigned the network bus to a device, then it notifies the device that tried to broadcast that a collision has occurred so that the network device may try again later. The amount of time that it takes for the repeater to receive a data signal and repeat that data signal out to every port on which the data signal is to be broadcast is referred to as the latency of the repeater.

The 802.3 specification contains maximum latency requirements that cannot be exceeded by a conforming repeater. The maximum permissible latency, combined with the requirements for maximum cable length and restrictions on the number and type of other devices allowed within a collision domain, limits the amount of time that it takes to notify a network device that a collision has occurred, ensuring that the overall 802.3 design criteria is met that all collisions are detected before a complete 64 byte frame is transmitted. If the maximum permissible latency were exceeded by a repeater, then multiple devices in the repeater's collision domain on an 802.3 ethernet network might broadcast complete frames of data before being notified of a collision. As described above, the broadcast of complete frames when a collision occurs would defeat a scheme for discarding data associated with collisions by simply discarding all partial frames. Thus, minimizing the latency of a repeater is critical if the repeater is to be implemented on a network in accordance with the 802.3 specification. The 100BaseT standard defines two classes of repeaters: Class I and Class II. At most, a collision domain can include one Class I or two Class II repeaters. Including more than one repeater in a single collision domain is sometimes referred to as cascading repeaters. Specifically, in order to conform to the Class II requirement, the latency a repeater must be less than 46 bit times. It should be noted that the standard is expressed in terms of bit times, or the amount of data that could be transmitted on the network during the latency period.

Network Flexibility

The Class II requirement, which allows more than one repeater to be included in a single collision domain, significantly adds flexibility to network topology. Expanding the number of ports available on a network may be accomplished by simply adding a second repeater in the same collision domain as a single existing repeater. No switch is required. By limiting the latency of the two repeaters, it is ensured that collisions can be detected and devices connected to different repeaters can be notified of collisions in time to stop sending data before a complete frame is broadcast.

Because networks tend to constantly change and expand with network devices being added, it would be highly advantageous if, in addition to the Class II feature of allowing two repeaters in a collision domain, it were also possible that each of the two Class II repeaters were expandable or stackable. Additional ports could be added to a first repeater stack that functions as one Class II repeater and then a second stack could be included as a second Class II repeater. Thus, stackability combined with cascadability would provide even greater flexibility for network expansion.

There is therefore a need for a stackable repeater that could be plugged into a network in a flexible manner along with a group of other repeaters in a stack. For a stack of such repeaters to conform to the latency requirements set forth in the standard, a very high speed, efficient repeater stack bus would be required. Specifically, in order to conform to the Class II requirement, the total latency of all of the repeaters in the stack connected to the repeater stack bus must be less than 46 bit times. A repeater stack synchronous bus for providing a fast connection among a group of stacked repeaters is disclosed in U.S. patent application Ser. No. 08/965,479 which was previously incorporated by reference for all purposes. Because the bus is synchronous, all of the repeaters on the bus are driven by a single master clock signal.

As noted above, one of the primary reasons for providing a repeater stack is to provide flexibility in configuring a network. Repeaters may be added or removed from the stack or repeaters in the stack may be powered on or off as the network is reconfigured. One way to provide a master clock to the repeater stack would be to provide an external clock to the stack. However, it would be more preferable if an internal clock in one of the repeaters could be selected and activated as the clock master for the repeater stack bus. What is needed is a reliable way of selecting a repeater to provide the master clock signal and activating that master clock signal for the repeater stack synchronous bus. Preferably, the master clock signal should be activated and propagated on the bus even when one or more repeaters on the bus are powered off.

SUMMARY OF THE INVENTION

Accordingly, the present invention provides methods and apparatuses for automatic activation of a clock master on a stackable repeater. A First On signal is generated within each repeater in the repeater stack such that, when the repeater is the first repeater in the stack to be turned on, the First On signal is high. For all other repeaters in the stack the First On signal is low. Each repeater in the stack when powered on is configured to ground a power state output pin that causes the First On signal of the next repeater in the stack to be low. If a repeater is powered off, then it is configured to pass along the state of the power state pin received from the previous repeater in the stack. Thus, the First On signal of the first repeater in the stack that is on is the only First On signal that is activated or high. The First On signal is used to control a switch that activates or deactivates a local repeater clock on each repeater by connecting or disconnecting the clock to a master clock pin on the repeater. Each master clock pin is connected to the other master clock pins via a stack bus cable. Thus, only the repeater with a high first on signal has a local repeater clock that is connected to the master clock pin. Every repeater in the stack uses the clock signal from the master clock pin.

It should be appreciated that the present invention can be implemented in numerous ways, including as a process, an apparatus, a system, a device, a method, or a computer readable medium. Several inventive embodiments of the present invention are described below. In one embodiment, an apparatus for automatically activating a clock master circuit in a stack of Fast Ethernet repeaters includes a first stackable Fast Ethernet repeater. The first stackable Fast Ethernet repeater includes a first on pin having a first on pin logical state. The first on pin logical state is indicative of whether or not the first stackable Fast Ethernet repeater is configured in the stack of Fast Ethernet repeaters so that no other Fast Ethernet repeater occupying a position in the Fast Ethernet repeater stack that is before the position of the first Fast Ethernet repeater is powered on. A weak pull up voltage source is connected to the first on pin. The weak pull up voltage is derived from a switched power supply in the Fast Ethernet repeater so that when the Fast Ethernet repeater is powered on, the weak pull up voltage is present and when the Fast Ethernet repeater is powered off, the weak pull up voltage is not present. A clock master circuit has an enable input that is controlled by the first on pin logical state. A second stackable Fast Ethernet repeater includes a power state output pin. The power state output pin is configured to be connected to ground when the second Fast Ethernet repeater is powered on. A connector cable runs from the first Fast Ethernet repeater to the second Fast Ethernet repeater. The connector cable connects the first on pin from the first stackable Fast Ethernet Repeater to the power state output pin of the second stackable Fast Ethernet repeater. Thus, the clock master circuit in the first stackable Fast Ethernet Repeater is enabled based on whether the second stackable Fast Ethernet repeater is powered on.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

As noted above, in order for a repeater to meet the Class II latency requirement, a synchronous repeater stack bus is provided in one embodiment. In one embodiment, the stacked repeaters are connected together with stack bus cables between the repeaters and the master clock signal is provided on the stack bus cable. This arrangement is particularly desirable because different repeaters can be plugged, unplugged, or exchanged by simply plugging and unplugging the cables. In contrast, an arrangement where repeaters plug directly into one another offers less convenience and flexibility. When stacked repeater units are reconfigured by changing the order in which the cables are plugged, repeaters on the end of the repeater stack synchronous bus may be moved to the middle of the bus or vice versa. Also, repeaters may be powered on or off at different times.

Figure 2:
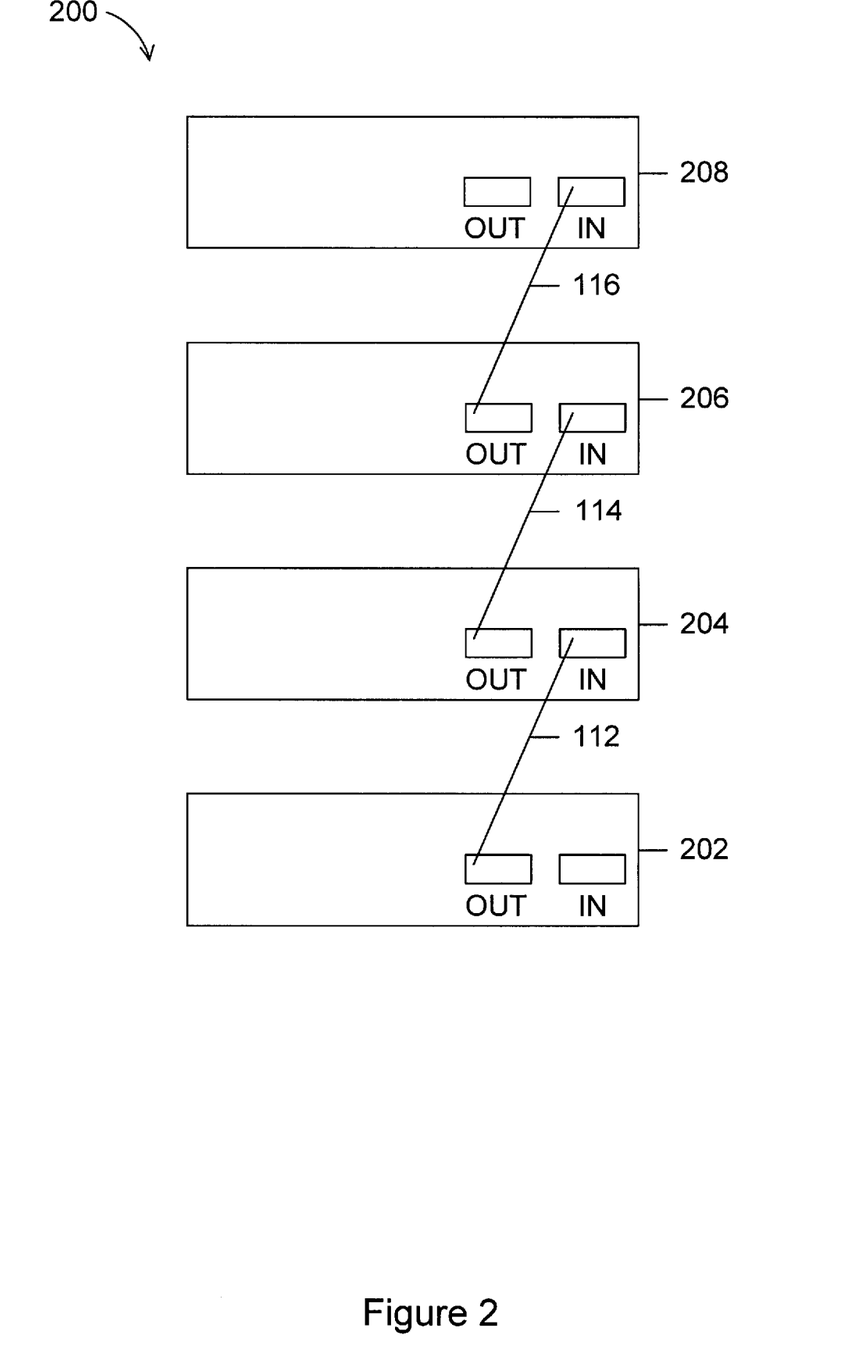
FIG. 2 is a block diagram illustrating a repeater stack.

FIG. 2 is a block diagram illustrating a repeater stack 200. Repeater stack 200 includes a bottom repeater 202, two middle repeaters 204 and 206, and a top repeater 208. Each of the repeaters in the repeater stack are connected to each other via a repeater stack bus that includes a stack bus connection cable 212 connected between repeater 202 and 204, a stack bus connection cable 214 connected between repeater 204 and 206, and a stack bus connection cable 216 connected between repeater 206 and 208. Each of the repeaters includes an input connector and an output connector. The output connector of each repeater in the stack is connected via the stack bus connection cable to the input connector of the repeater above it in the stack. It should be noted that in some embodiments the order of the repeater connectors may be changed. In fact, it is an important advantage of this arrangement that the stack can be reconfigured and the repeaters reordered by simply plugging and unplugging the repeater bus cable.

Each output and input connector includes a master clock signal pin that carries the master clock signal that is used by each repeater. The repeater that is selected to provide the clock master activates a clock master circuit so it provides the master clock signal to the master clock signal pin. Because the repeaters in the stack may be easily reconfigured, it is important that a system for activating the clock master circuit be implemented in each repeater to ensures that one and only one repeater in the stack activates its clock master circuit and provides a master clock signal to the master clock pin. In one embodiment, the first repeater in the stack that is powered on starting from the bottom of the stack and going upward is selected as the repeater to provide the master clock.

Figure 3:
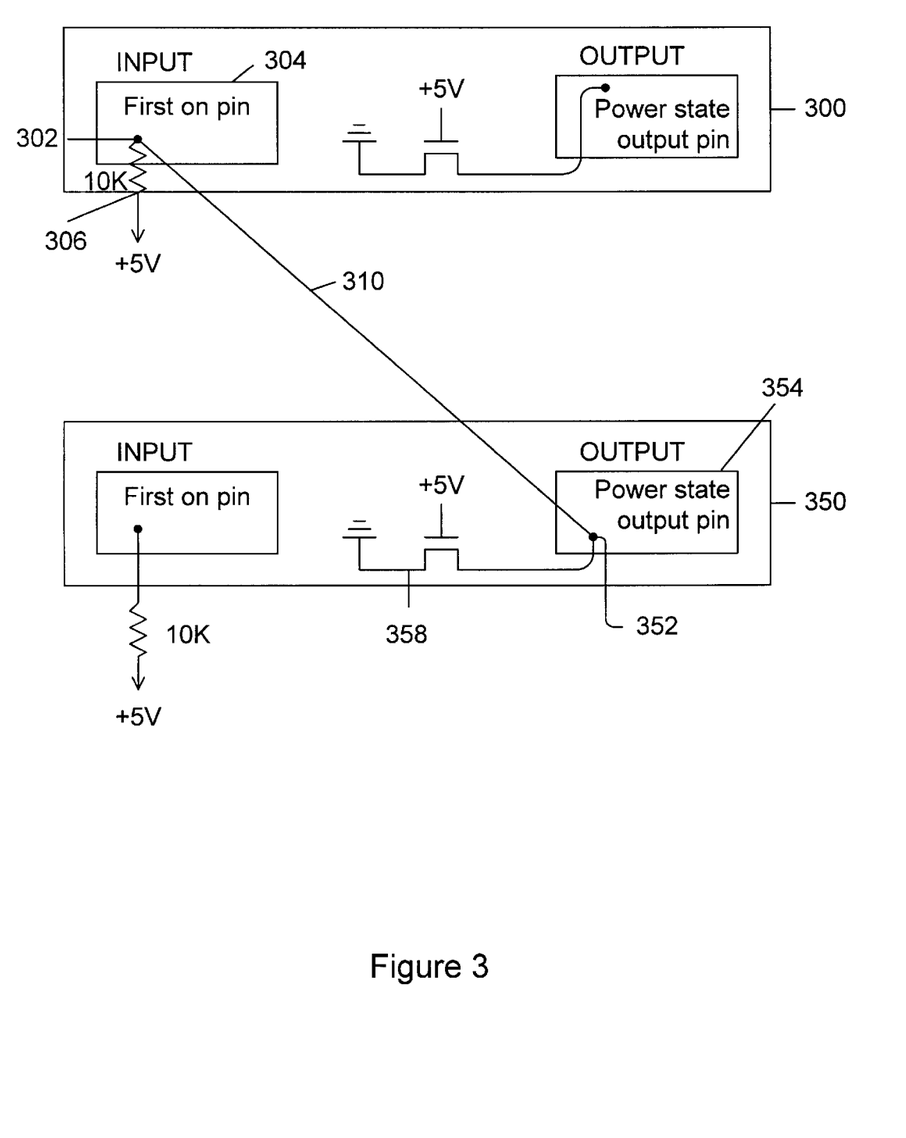
FIG. 3 is a schematic diagram illustrating how a first on signal is generated in a repeater based on its power status and the power status of a bottom repeater immediately below it in a repeater stack.

FIG. 3 is a schematic diagram illustrating how a first on signal is generated in a repeater 300 based on its power status and the power status of a bottom repeater 350 immediately below it in a repeater stack. Repeater 300 includes a first on pin 302 on an input connector 304. First on pin 302 is connected to a weak 5V pull up voltage 305 through a resistor 306. Pull up voltage 305 is only present when Repeater 300 is powered on. Thus, first on pin 302 is pulled high whenever repeater 300 is on unless it is grounded by a connection made to it. First on pin 302 is connected via a stack bus connection cable 310 to a power state output pin 352 on an output connector 354 on repeater 350. Power state output pin 352 is connected via an MOS switch 358 to ground. MOS switch 358 is controlled by a 5V signal that is provided to close MOS switch 358 when repeater 350 is powered on. When repeater 350 is powered off, then no 5V signal is sent to MOS switch 358 and MOS switch 358 is open. When MOS switch 358 is open, then power state output pin 352 is allowed to float so that it is pulled high by first on pin 302 whenever repeater 300 is on.

Thus, when first on pin 302 is high, repeater 300 is the first repeater in the stack that is powered on. When first on pin 302 is grounded by power state output pin 352 on repeater 350, then the first repeater that is powered on is repeater 350. If repeater 300 is not powered on, then the 5V pull-up voltage is not connected to first on pin 302 and first on pin 302 either floats or is grounded, depending on the state of power state output pin 352. The first on signal from first on pin 302 therefore indicates whether repeater 300 is the first repeater in the stack that is powered on. The first on signal therefore may be used to enable the clock master circuit inside repeater 300, as is shown in detail in FIG. 5. It should be noted that in this example repeater 350 is the bottom repeater in the stack. An example where a middle repeater provides a power state output signal that is derived from the power state of both the middle repeater and one or more repeaters below the middle repeater is explained in connection with FIG. 4.

It is important that when one or more repeaters in the middle of the stack are powered off, it is still possible to determine the first on repeater for the purpose of selecting the repeater to provide the master clock signal. Therefore, in one embodiment, each repeater in the middle of the stack transmits the power state of any repeater below it in the stack that is powered on so that a repeater above in it in the stack does not activate its master clock circuit in error.

Figure 4:
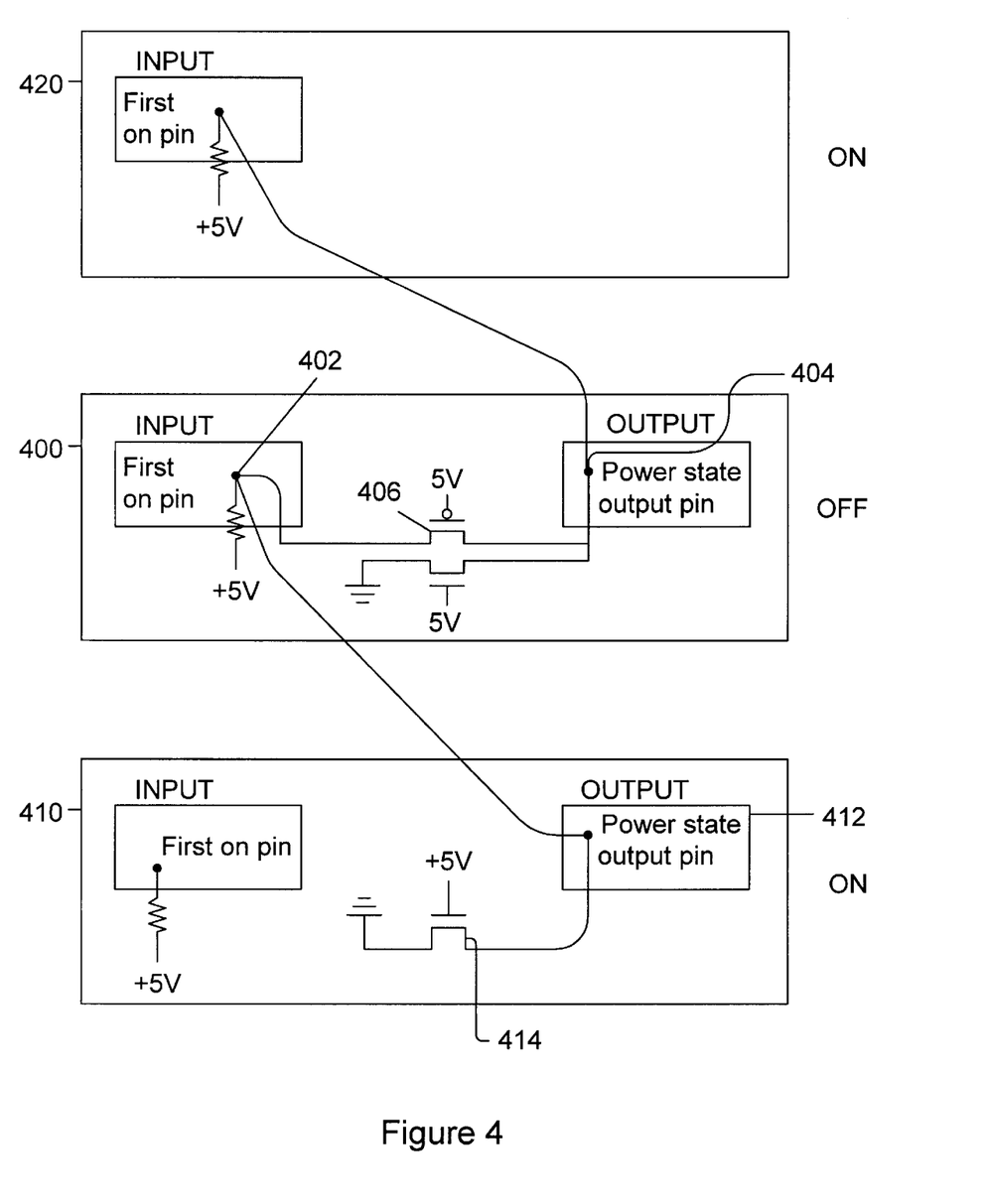
FIG. 4 is a schematic diagram illustrating how a middle repeater transmits the power state of a powered on bottom repeater that is below the middle repeater in the repeater stack to a top repeater that is above the middle repeater in the repeater stack.

FIG. 4 is a schematic diagram illustrating how a middle repeater 400 that is powered off transmits the power state of a powered on bottom repeater 410 that is below middle repeater 400 in the repeater stack to a top repeater 420 that is above middle repeater 400 in the repeater stack. For the purpose of illustration, it is assumed in this example that bottom repeater 410 is powered on; middle repeater 400 is powered off, and top repeater 420 is powered on.

As is described in FIG. 3, when bottom repeater 410 is powered on, a first on pin 402 is grounded by a power state output pin 412 located on the output connector of bottom repeater 410 that is connected to ground through an MOS switch 414. The fact that first on pin 402 is grounded indicates that middle repeater 400 or any other repeater above it cannot be the first repeater on the stack that is powered on. In this case, however, repeater 400 is not itself powered on. It would not be desirable for middle repeater 400 to indicate its own powered off state allowing a power state output pin 404 that is located on an output connector 404 of middle repeater 400 to float. If power state output pin 404 were allowed to float, then a first on pin 422 on top repeater 420 would be pulled high and the first on signal for top repeater 420 would be erroneously high since bottom repeater 410 is on and it is below top repeater 420 in the stack.

To avoid the above described problem, a normally open MOS switch 406 is included inside repeater 400. Normally closed MOS switch 406 is controlled by an input that is 5V or high whenever middle repeater 400 is powered on. This opens MOS switch 406. Whenever middle repeater 400 is powered off, then MOS switch 406 is closed. MOS switch connects first on pin 402 to power state output pin 404. So long as middle repeater is powered on, MOS switch 406 is open and the signal on power state output pin 404 is determined by an MOS switch 408 in the same way that MOS switch 414 determines the signal on power state output pin 412. Thus, middle repeater 400 indicates its own on state to top repeater 420 whenever middle repeater is powered on. When middle repeater 400 is powered off, middle repeater 400 does not always allow power state output pin 404 to float. Instead, MOS switch 406 is closed and power state output pin 404 is connected to first on pin 402. First on pin 402 carries the power state output signal from bottom repeater 410, the repeater below middle repeater 400 on the repeater stack. Thus, when middle repeater 400 is on, its state is indicated on power state output pin 404 and power state output pin 404 is isolated from first on pin 402. When middle repeater 400 is not on, then its state is not indicated on power state output pin 404. Instead, power state output pin relays the signal from the power state output pin of the repeater below it in the stack.

Thus, each repeater in the stack includes a first on pin on its input connector. The state of each first on pin indicates whether its repeater is the first repeater on the stack that is powered on.

Figure 5:
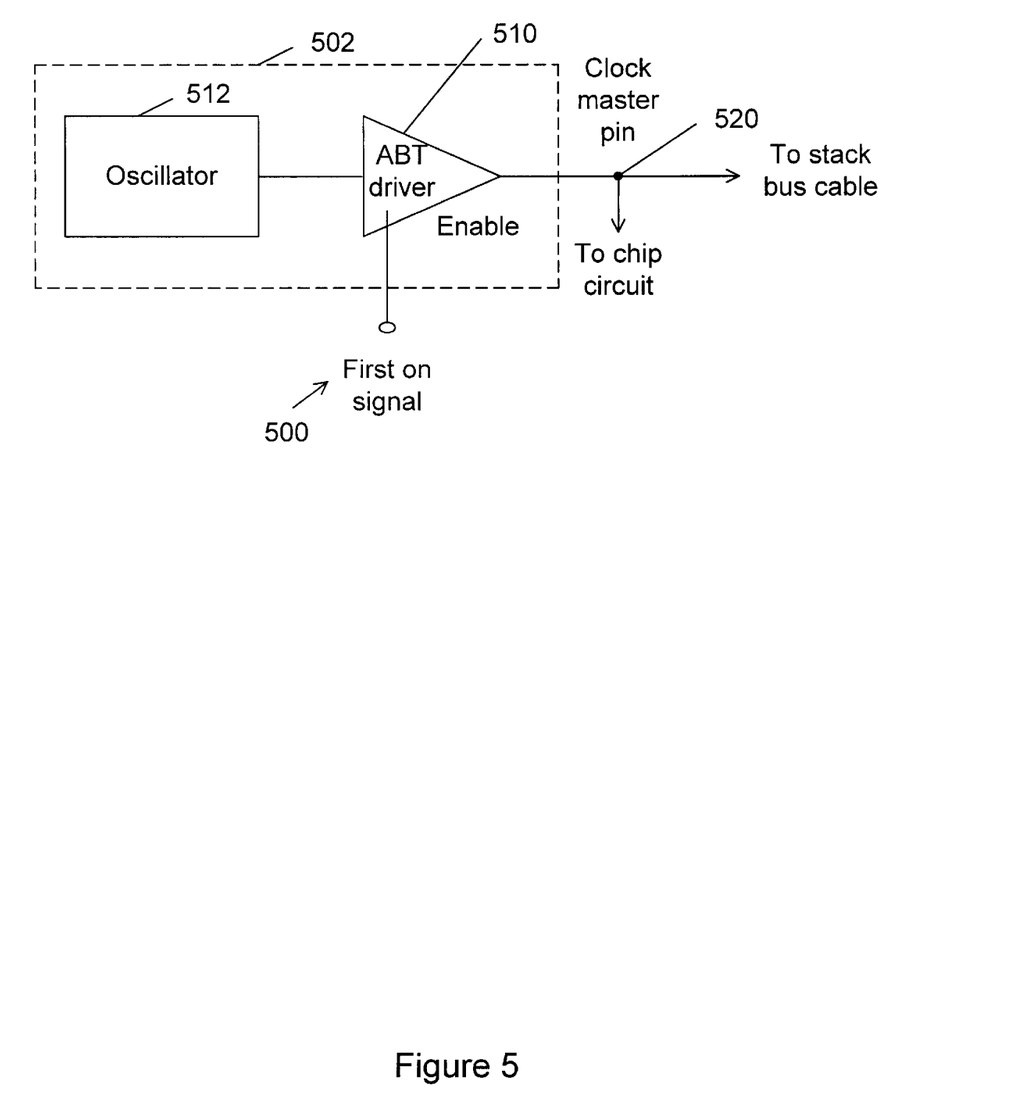
FIG. 5 is a schematic diagram illustrating how a first on signal derived for a repeater is used to activate or deactivate a clock master circuit in the repeater.

FIG. 5 is a schematic diagram illustrating how a first on signal 500 derived for a repeater is used to activate or deactivate a clock master circuit 502 in the repeater. An ABT driver 510 is connected to the output of an oscillator 512. It should be noted that other tri-state drivers are used in other embodiments. Together ABT driver 510 and oscillator 512 make up a clock master circuit. ABT driver 510 provides a master clock signal to a clock master pin 520 whenever ABT driver 510 is enabled. Clock master pin 520 is connected to the rest of the stack bus by a stack bus cable. First on signal 500 is connected to ABT driver 510 so that ABT driver 510 is enabled only when first on signal 500 is high. Thus, master clock circuit 502 drives clock master pin 520 only when first on signal 500 is high. It should be noted that, preferably, the repeater that provides the master clock signal itself derives its own clock that it uses to synchronize with the rest of the bus from the output to its own clock master pin 520 and not from some other internal source.

An apparatus and method has been disclosed for determining which repeater in a repeater stack is the first repeater that is powered on. The first repeater that is powered on has a first on signal that is high. The first on signal is used to enable or activate a clock master circuit that provides a master clock signal for all of the repeaters in the stack.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. An apparatus for automatically activating a clock master circuit in a stack of Fast Ethernet repeaters comprising:
   a first stackable Fast Ethernet repeater including:
      a first on pin having a first on pin logical state, the first on pin logical state being indicative of whether or not the first stackable Fast Ethernet repeater is configured in the stack of Fast Ethernet repeaters so that no other Fast Ethernet repeater occupying a position in the Fast Ethernet repeater stack that is before the position of the first Fast Ethernet repeater is powered on;
      a weak pull up voltage source connected to the first on pin, the weak pull up voltage being derived from a switched power supply in the Fast Ethernet repeater so that when the Fast Ethernet repeater is powered on, the weak pull up voltage is present and when the Fast Ethernet repeater is powered off, the weak pull up voltage is not present; and
      a clock master circuit having an enable input wherein the enable input is controlled by the first on pin logical state;
   a second stackable Fast Ethernet repeater including a power state output pin, the power state output pin being configured to be connected to ground when the second Fast Ethernet repeater is powered on; and
   a connector cable running from the first Fast Ethernet repeater to the second Fast Ethernet repeater, the connector cable connecting the first on pin from the first stackable Fast Ethernet Repeater to the power state output pin of the second stackable Fast Ethernet repeater.
      whereby the clock master circuit in the first stackable Fast Ethernet Repeater is enabled based on whether the second stackable Fast Ethernet repeater is powered on.

2. An apparatus for automatically activating a clock master circuit in a stack of Fast Ethernet repeaters as recited in claim 1 wherein the power state output pin is configured to float when the Fast Ethernet repeater is powered on.

3. An apparatus for automatically activating a clock master circuit in a stack of Fast Ethernet repeaters as recited in claim 1 wherein the power state output pin is configured to be connected to a second stackable Fast Ethernet repeater first on pin on a second stackable Fast Ethernet repeater when the second stackable Fast Ethernet repeater is powered off so that the state of the second stackable Fast Ethernet repeater first on pin is transferred to the first on pin of the first stackable Fast Ethernet repeater when the second stackable Fast Ethernet repeater is powered off.

4. An apparatus for automatically activating a clock master circuit in a stackable Fast Ethernet repeater comprising:
   an local input connector including a local first on pin having a first on pin logical state, the local first on pin logical state being indicative of whether or not the stackable Fast Ethernet repeater is configured in a stack of Fast Ethernet repeaters in a manner indicating that the Fast Ethernet repeater is not selected to activate the clock master circuit and wherein the local input connector is configured to connect the local first on pin to a remote power state output pin on a remote output connector when the local input connector is connected to the remote output connector;
   a weak pull up voltage source connected to the local first on pin, the weak pull up voltage being derived from a switched power supply in the Fast Ethernet repeater so that when the Fast Ethernet repeater is powered on, the weak pull up voltage is present and when the Fast Ethernet repeater is powered off, the weak pull up voltage is not present; and
   a clock master circuit having an enable input wherein the enable input is controlled by the first on pin logical state;
      whereby the clock master circuit is enabled according to the state of the local first on pin and the local first on pin is pulled high by the weak pull up voltage unless the local first on pin is connected to a remote power state output pin that pulls the local first on pin low.

5. An apparatus for automatically activating a clock master circuit in a stackable Fast Ethernet repeater as recited in claim 4 further including a local output connector having a local power state output pin configured to be connected to ground when the Fast Ethernet repeater is powered on and configured to be allowed to float when the Fast Ethernet repeater is powered off.

6. An apparatus for automatically activating a clock master circuit in a stackable Fast Ethernet repeater as recited in claim 4 further including a local output connector having a local power state output pin configured to be connected to ground when the Fast Ethernet repeater is powered on and configured to be connected to the local first on pin when the Fast Ethernet repeater is powered off.

7. A method of automatically activating a clock master circuit in a stack of Fast Ethernet repeaters comprising:
   selectively connecting a first on pin in a first stackable Fast Ethernet repeater to a weak pull up voltage source when the first stackable Fast Ethernet repeater is powered on;
   connecting the first on pin in the first stackable Fast Ethernet repeater to a power state output pin in a second stackable Fast Ethernet repeater wherein the power state output pin is configured to be connected to ground when the second Fast Ethernet repeater is powered on; and
   enabling a clock master circuit having an enable input based on the voltage on the first on pin.

8. A method of automatically activating a clock master circuit in a stack of Fast Ethernet repeaters as recited in claim 7 further including connecting the power state output pin to ground when the second Fast Ethernet repeater is powered on and allowing the power state output pin to float when the second Fast Ethernet repeater is powered off.

9. A method of automatically activating a clock master circuit in a stack of Fast Ethernet repeaters as recited in claim 7 further including connecting the power state output pin to the a second stackable Fast Ethernet repeater first on pin on the second stackable Fast Ethernet repeater when the second stackable Fast Ethernet repeater is powered off so that the state of the second stackable Fast Ethernet repeater first on pin is transferred to the first on pin of the first stackable Fast Ethernet repeater when the second stackable Fast Ethernet repeater is powered off.

* * * * *